(12) United States Patent
Matthias et al.

(10) Patent No.: US 9,595,701 B2
(45) Date of Patent: Mar. 14, 2017

(54) HANDHELD TOOL, HANDHELD TOOL ADD-ON MEASURING DEVICE AND HANDHELD TOOL BATTERY

(75) Inventors: Wolf Matthias, Stuttgart (DE); Gunter Flinspach, Leonberg (DE); Alexander Osswald, Stuttgart (DE); Rainer Glauning, Leinfelden-Echterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 751 days.

(21) Appl. No.: 13/503,310

(22) PCT Filed: Oct. 8, 2010

(86) PCT No.: PCT/EP2010/065115
§ 371 (c)(1),
(2), (4) Date: Jun. 29, 2012

(87) PCT Pub. No.: WO2011/047975
PCT Pub. Date: Apr. 28, 2011

(65) Prior Publication Data
US 2012/0267134 A1    Oct. 25, 2012

(30) Foreign Application Priority Data
Oct. 23, 2009   (DE) .................. 10 2009 045 946

(51) Int. Cl.
| | | |
|---|---|---|
| B25B 21/00 | (2006.01) | |
| B25B 23/00 | (2006.01) | |
| B25F 5/00 | (2006.01) | |
| B25B 23/14 | (2006.01) | |
| H01M 2/10 | (2006.01) | |
| B25F 5/02 | (2006.01) | |
| H01M 10/48 | (2006.01) | |
| G01S 17/06 | (2006.01) | |

(52) U.S. Cl.
CPC .......... *H01M 2/1022* (2013.01); *B25F 5/021* (2013.01); *G01S 17/06* (2013.01); *H01M 10/48* (2013.01)

(58) Field of Classification Search
CPC ......... B25B 21/00; B25B 23/00; B25B 23/14; B25F 5/00; B25D 2250/221
USPC ......................................... 173/1, 2, 176, 217
See application file for complete search history.

(56) References Cited

U.S. PATENT DOCUMENTS

| | | | |
|---|---|---|---|
| 6,536,536 B1 * | 3/2003 | Gass et al. ........................ | 173/2 |
| 6,851,487 B1 * | 2/2005 | Shotey ............................ | 173/1 |
| 7,334,648 B2 * | 2/2008 | Arimura ....................... | 173/179 |

(Continued)

FOREIGN PATENT DOCUMENTS

| | | |
|---|---|---|
| DE | 102 14 364 | 10/2003 |
| DE | 10 2005 020829 | 11/2006 |

(Continued)

OTHER PUBLICATIONS

International Search Report PCT/EP2010/065115.

*Primary Examiner* — Andrew M Tecco
*Assistant Examiner* — Praachi M Pathak
(74) *Attorney, Agent, or Firm* — Gerard Messina

(57) ABSTRACT

A handheld tool having a battery interface is described, in which a provision is made for the handheld tool to have at least one measuring device interface, which is provided to receive at least data containing measuring information of a handheld tool add-on measuring device.

17 Claims, 2 Drawing Sheets

(56) References Cited

U.S. PATENT DOCUMENTS

| | | | |
|---|---|---|---|
| 7,395,875 B2 * | 7/2008 | Krondorfer et al. | 173/217 |
| 2004/0050568 A1 * | 3/2004 | Orozco, Jr. | 173/100 |
| 2005/0221654 A1 * | 10/2005 | Phillips et al. | 439/347 |
| 2006/0087283 A1 | 4/2006 | Phillips et al. | |
| 2006/0087285 A1 | 4/2006 | Phillips et al. | |
| 2007/0103116 A1 | 5/2007 | Johnson et al. | |
| 2007/0224492 A1 | 9/2007 | Scott et al. | |
| 2008/0011102 A1 * | 1/2008 | Schell et al. | 73/862.22 |
| 2009/0101379 A1 * | 4/2009 | Du et al. | 173/176 |

FOREIGN PATENT DOCUMENTS

| | | |
|---|---|---|
| DE | 10 2005 030212 | 1/2007 |
| DE | 20 2006 014606 | 1/2007 |
| EP | 1 927 438 | 6/2008 |
| JP | 2005 224909 | 8/2005 |

* cited by examiner

HANDHELD TOOL, HANDHELD TOOL ADD-ON MEASURING DEVICE AND HANDHELD TOOL BATTERY

FIELD OF THE INVENTION

The present invention is based on a handheld tool.

BACKGROUND INFORMATION

It is understood that handheld tools, in particular a handheld machine tool, having a battery interface has been proposed.

SUMMARY OF THE INVENTION

The exemplary embodiments and/or exemplary methods of the present invention are based on a handheld tool, in particular a handheld machine tool, having a battery interface, as described herein.

A provision is made for the handheld tool to have at least one measuring device interface, which is provided to receive at least data containing measuring information of a handheld tool add-on measuring device. A "battery interface" is to be understood in particular as an interface, which in at least one operating state takes up an operating energy for a main action arrangement, for example a measuring sensor and/or in particular a drive motor. The battery interface may contact a battery situated either within and/or advantageously at least partially outside of a handheld tool housing of the handheld tool. Advantageously, a mechanical and/or electrical connection of the battery interface is disconnectable without the use of a tool.

In particular, a "measuring device interface" is to be understood as an interface, by which an operator may retrofit a handheld tool with a handheld tool add-on measuring device.

The measuring device interface and the battery interface may be functionally separated and/or in particular spatially separated. Alternatively, the measuring device interface and the battery interface, in particular a mechanical mount, may be configured at least partially in one piece. A "handheld tool add-on measuring device" is to be understood in particular as a retrofit measuring device, constructionally separated from the handheld tool and in particular constructionally separated from a handheld tool battery, having a measuring sensor, which detects at least one measuring information in operation and provides the measuring information so that it may be retrieved by the handheld tool. The handheld tool add-on measuring device advantageously measures an inclination, a distance, a temperature, a humidity, a condition of a workpiece and/or it detects another measuring information that appears practical to one skilled in the art.

In particular, "provided" is to be understood as specifically equipped, configured and/or programmed. A "handheld tool" is to be understood in particular as a handheld tool that appears practical to one skilled in the art such as in particular a percussion drill, a saw, a plane, a screwdriver, a milling tool, a grinder, and angle grinder, a measuring tool, a multifunction tool and/or in particular a drill. The handheld tool is advantageously configured as a handheld machine tool. The handheld tool may be utilizable also in a manner functionally separated from the handheld tool add-on measuring device. Advantageously, a handheld tool retrofitted with the handheld tool add-on measuring device has at least one further function dependent on the measuring information. The development of the handheld tool in accordance with the present invention makes it possible to retrofit in a constructionally simple manner an existing handheld tool with a function that is based on a measuring information, and thus a particularly versatile, flexible and comfortable handheld tool may be obtained.

Another development provides for the handheld tool to have a control unit that is provided to influence a work process as a function of the measuring information. A "control unit" is to be understood in particular also as a unit that performs a closed-loop control function. The control unit may have a processing unit. A "work process" is to be understood in particular as a period of time, in which the main arrangement of action of the handheld tool performs a task, i.e., in particular performs a measurement or advantageously machines a workpiece.

The expression "as a function of the measuring information" is to be understood in particular in the sense that the control unit takes up the measuring information, processes it and outputs a controlled and/or regulated variable. A controlled and/or regulated variable of the control unit may influence a state of the main arrangement of action. The control unit's influence on the work process makes it possible to provide particularly advantageous functions in a particularly flexible manner that support an operator while working. Alternatively or additionally, the control unit or a part of the control unit may be situated in the handheld tool add-on measuring device and/or in the handheld tool battery and/or be a component thereof.

The exemplary embodiments and/or exemplary methods of the present invention furthermore provide for the control unit to be configured to stop a work process as a function of the measuring information, whereby safety functions and automatic machining end positions may be advantageously achieved. "To stop" is to be understood in particular as stopping an insertion tool, terminating a measuring process and/or terminating a work process in another manner that seems practical to one skilled in the art. Alternatively or additionally, the control unit could prevent the start of a work process and/or start a work process.

The exemplary embodiments and/or exemplary methods of the present invention furthermore provide for the measuring device interface to be disconnectable without the use of a tool, whereby an operator may equip the handheld tool particularly comfortably with various handheld tool add-on measuring devices, particularly for brief periods. The phrase "disconnectable without the use of a tool" is to be understood in particular as a user being able manually to disconnect a handheld tool add-on measuring device connected to the measuring device interface mechanically and in particular electrically from the measuring device interface, without requiring an additional tool for this purpose. The handheld tool add-on measuring device and the handheld tool may have two separately configured housings. Advantageously, an operator is able to connect various handheld tool add-on measuring devices, which in particular allow for various functionalities, to the handheld tool.

In addition, the exemplary embodiments and/or exemplary methods of the present invention provide for the measuring device interface to have at least one receiving arrangement, which is configured to receive wirelessly transmitted data containing measuring information, which makes it possible to situate the handheld tool add-on measuring device in a particularly flexible manner and requires no conductive contacts on a surface. A "receiving arrangement" is to be understood in particular as an arrangement that, in at least one operating state, receives power, describing data containing measuring information, transmitted capacitively, optically, inductively, in a manner that seems practical to one skilled in the art and/or in particular electromagnetically. The phrase "receive wirelessly" is to be understood in particular in such a way that the receiving arrangement is configured to receive information transmitted via a bodiless information carrier. Alternatively or additionally, the measuring device interface has a receiving arrangement that receives the data in a wire-bound fashion in at least one operating state. "Wire-bound" is to be understood in particular as transmitted via an electrical conductor.

One advantageous development of the exemplary embodiments and/or exemplary methods of the present invention provides for the handheld machine tool to have an energy interface, which outputs an operating energy to the handheld tool add-on measuring device in at least one operating state. "An energy interface" is to be understood in particular as an interface able to transmit an electrical energy via in particular a conductive contact arrangement. Alternatively or additionally, the energy interface could also transmit an energy inductively. The energy interface is in particular provided to transmit at least an energy of at least 0.1 watt, advantageously at least 1 watt, particularly advantageously at least 10 watts. The term "operating energy" is to be understood in particular as an energy that is at least provided to supply a measuring sensor and/or transmitting arrangement of the handheld tool add-on measuring device with energy. Alternatively or additionally, the handheld tool add-on measuring device could have an operating energy store. The energy interface advantageously makes it possible to develop the handheld tool add-on measuring device in a particularly inexpensive manner.

Furthermore, the exemplary embodiments and/or exemplary methods of the present invention are based on a handheld tool add-on measuring device having at least one handheld tool interface, which is provided to transmit data containing measuring information at least to one handheld tool in accordance with the present invention. A "handheld tool interface" is to be understood in particular as an interface that, in an operation-ready state, is connected indirectly or directly with the handheld tool. In particular, the phrase "transmit data" is to be understood in the sense that the handheld tool interface outputs or provides a power that describes data containing measuring information. The development of the handheld tool add-on measuring device according to the present invention makes it possible to retrofit the handheld tool with various additional functions in a particularly flexible and constructionally simple manner.

Another development provides for the handheld tool add-on measuring device to have an energy interface that is provided to take up an operating energy from a handheld tool battery that at the same time supplies the handheld tool. A "handheld tool battery" is to be understood in particular as a battery that supplies at least the main arrangement of action of the handheld tool with operating energy in at least one operating state. The handheld tool battery advantageously supplies the handheld tool and the handheld tool add-on measuring device simultaneously with an operating energy. The energy interface of the handheld tool add-on measuring device may be configured to be connected to a measuring device interface of a handheld tool battery or to the energy interface of the handheld tool. The energy interface makes it possible to develop the handheld tool add-on measuring device in a constructionally simple manner using fewer component parts, in particular in that the handheld tool add-on measuring device is configured without an operating energy store.

There is furthermore a provision for the handheld tool interface to have a transmitting arrangement configured to transmit the data wirelessly. "Transmitting arrangement" is to be understood in particular as an arrangement that, in at least one operating state, transmit, via a power output, at least data containing measuring information capacitively, optically, inductively, in a manner that seems practical to one skilled in the art and/or in particular electromagnetically. The wirelessly transmitting transmitting arrangement makes it possible to achieve in a constructionally simple manner a particularly flexible and comfortable data transmission, in particular without surface-mounted conductive contacts.

In addition, the exemplary embodiments and/or exemplary methods of the present invention are based on a handheld tool battery having a handheld tool interface configured to transmit at least energy to a handheld tool according to the present invention.

The exemplary embodiments and/or exemplary methods of the present invention provide for the handheld tool battery to have at least one measuring device interface, which, in at least one operating state, transmits an energy to a handheld tool add-on measuring device according the present invention, which may be directly. In particular, a "handheld tool interface" is to be understood as an interface that is at least configured to output an energy to a main arrangement of action of the handheld tool, in particular, in at least one operating state, at least 1 watt, advantageously at least 10 watts, particularly advantageously at least 100 watts. In this connection, a "measuring device interface" is to be understood in particular as an interface that is at least configured to output an energy to a main arrangement of action of the handheld tool add-on measuring device, in particular, in at least one operating state, at least 0.1 watt, advantageously at least 1 watt, particularly advantageously at least 10 watts.

The handheld tool interface and the measuring device interface may be functionally separated and/or in particular spatially separated. Advantageously, the handheld tool interface and/or the measuring device interface is/are configured to transmit an energy inductively and/or in particular wirelessly. The development of the handheld tool battery according to the present invention makes it possible to supply the handheld tool add-on measuring device with energy in a constructionally simple manner and in particular to situate the handheld tool add-on measuring device advantageously. In addition, in a corresponding development of the handheld tool add-on measuring device, the handheld tool battery and the handheld tool add-on measuring device are advantageously able to perform a measuring task separately from the handheld tool.

One advantageous development of the exemplary embodiments and/or exemplary methods of the present invention provides for the measuring device interface to be configured to receive data containing measuring information from the handheld tool add-on device, particularly in a wire-bound manner, which makes it possible in a constructionally simple manner to provide and in particular process measuring data from the handheld tool add-on measuring device in the handheld tool battery.

Another development provides for the handheld tool interface to be configured to transmit at least data containing measuring information, in particular in wire-bound fashion, to the handheld tool, which makes it possible to transmit measuring information to the handheld tool in a constructionally particularly simple manner.

The exemplary embodiments and/or exemplary methods of the present invention furthermore provide for the handheld tool battery to have at least one switching element, which is configured to switch and/or in particular switch off an energy supply of the handheld tool as a function of the data containing measuring information. A "switching element" is to be understood in particular as a switching element that seems practical to one skilled in the art, using which an electrically transmitted energy may be switched on, controlled and/or in particular interrupted. In particular, the phrase "as a function of the data containing measuring information" is to be understood as a control unit of the handheld tool battery evaluating the measuring information and controlling the switching element based on the evaluation. Because of the switching element, the handheld tool battery is able to perform various functions and in particular protective functions with particularly little effort. Advantageously, a redundancy may thereby be achieved in a constructionally simple manner.

The exemplary embodiments and/or exemplary methods of the present invention are furthermore based on a system having a handheld tool add-on measuring device according to the present invention and having a handheld tool according to the present invention and/or a handheld tool battery according to the present invention, whereby the handheld tool add-on measuring device, the handheld tool and/or the handheld tool battery may be advantageously adjusted to one another.

Further advantages are derived from the subsequent description of the drawing. The drawing shows two exemplary embodiments of the present invention. The drawing, the description and the claims contain numerous features in combination. One skilled in the art will expediently also consider the features individually, and will combine them into useful further combinations.

DETAILED DESCRIPTION

Figure 1:
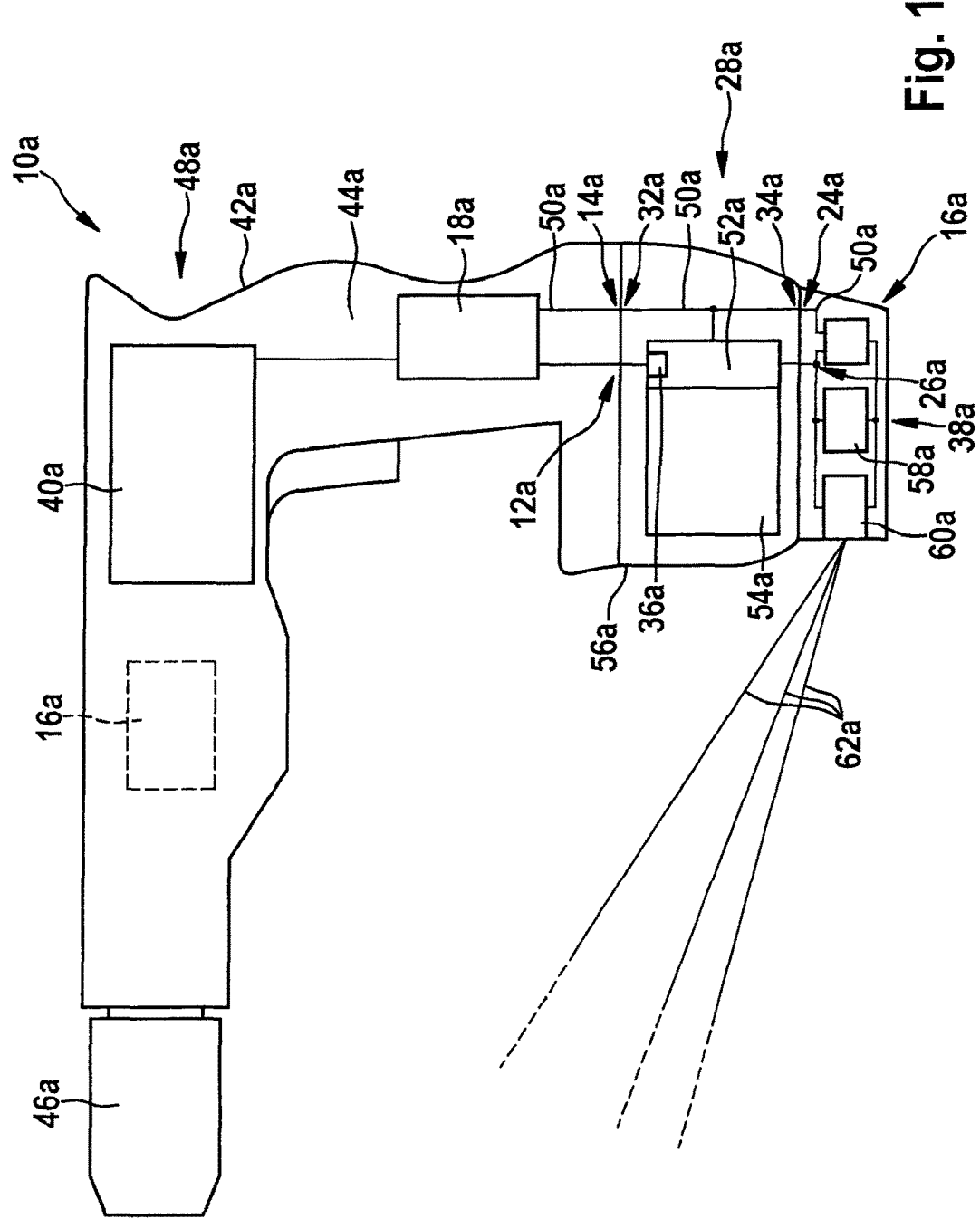
FIG. 1 shows a system according to the present invention having a handheld machine tool, a handheld tool add-on measuring device and a handheld tool battery.

FIG. 1 shows a system 38a according to the present invention having a handheld tool 10a, a handheld tool add-on measuring device 16a and a handheld tool battery 28a. Handheld tool 10a is configured as a handheld machine tool or as a percussion drill. Handheld tool 10a has a battery interface 12a, a measuring device interface 14a, a control unit 18a, a main arrangement of action 40a, a pistol-shaped handheld tool housing 42a having a main hand grip 44a and an insertion tool fastener 46a.

The main arrangement of action 40a is configured as an electric motor and is situated in an essentially tubular upper region 48a of handheld tool housing 42a. In operation, the main arrangement of action 40a drives the insertion tool fastener 46a in a rotating manner. Insertion tool fastener 46a is situated at an end of upper region 48a facing away from main hand grip 44a.

Control unit 18a is situated in main hand grip 44a between battery interface 12a and main arrangement of action 40a and is operatively connected with main arrangement of action 40a and battery interface 12a. In an operation-ready state, battery interface 12a connects handheld tool battery 28a with handheld tool 10a in a manner that is electrically and mechanically disconnectable without the use of a tool. For this purpose, a mechanical connection element of battery interface 12a (not shown) is configured in one piece with a mechanical connection element of measuring device interface 14a. Measuring device interface 14a is likewise configured to be disconnectable without the use of a tool and in this exemplary development is likewise connected with handheld tool battery 28a.

Furthermore, measuring device interface 14a is configured as an interface for a schematically depicted data connection 50a. Data connection 50a is configured as a data bus. In operation, measuring device interface 14a of handheld tool 10a receives data containing measuring information of handheld tool add-on measuring device 16a from handheld tool battery 28a. Data connection 50a transmits these data to control unit 18a of handheld tool 10a. Control unit 18a has a microcontroller.

On the basis of the measuring information of the data, control unit 18a influences a state of main arrangement of action 40a in a partially automatic manner. In this exemplary embodiment, the measuring information contains information about the inclination of system 38a, information about a distance of the handheld tool 10a from a workpiece (not shown) and information about an orientation of system 38a relative to the workpiece and perpendicular to the inclination. Based on this information, control unit 18a prevents the start of work if handheld tool 10a or an insertion tool does not have a specific orientation, in this case perpendicular to the workpiece. Control unit 18a furthermore stops a work process in that it stops the insertion tool when a desired machining depth has been reached. Corresponding input and display arrangement for an operator are not shown.

Handheld tool battery 28a is situated on main hand grip 44a on an end of handheld tool housing 42a facing away from insertion tool fastener 46a. Handheld tool battery 28a has a measuring device interface 34a, a handheld tool interface 32a, a control unit 52a and an energy store 54a. In an operation-ready state, handheld tool interface 32a of handheld tool battery 28a is connected with battery interface 12a and measuring device interface 14a of handheld tool 10a. Handheld tool interface 32a then transmits the data containing the measuring information and an energy, with which the main arrangement of action 40a of handheld tool 10a is supplied, to handheld tool 10a.

Measuring device interface 34a of handheld tool battery 28a is situated on a side of a housing 56a of handheld tool battery 28a across from insertion tool fastener 46a of handheld tool battery 28a. Measuring device interface 34a of handheld tool battery 28a is connected to handheld tool add-on measuring device 16a and, in an operation-ready state, receives data containing measuring information from the handheld tool add-on measuring device 16a and transmits energy to the handheld tool add-on measuring device 16a. Alternatively, a handheld tool add-on measuring device could be connected directly with a measuring device interface of handheld tool 10a (shown by a dashed line).

Control unit 52a of handheld tool battery 28a has a switching element 36a, which switches an energy supply of handheld tool 10a as a function of the measuring information of the data. Based on the inclination of system 38a described by the measuring information, control unit 52a of handheld tool battery 28a detects an uncontrolled blocking case of handheld tool 10a and in this case switches off the energy supply of handheld tool 10a.

Handheld tool add-on measuring device 16a has a handheld tool interface 24a, an energy interface 26a, a transmitting arrangement 30a and an inclination sensor 58a and a distance measuring sensor 60a. A mechanical connecting element (not shown) of handheld tool interface 24a is configured in one piece with a mechanical connecting element of energy interface 26a. In operation, using transmitting arrangement 30a, handheld tool interface 24a transmits data containing measuring information via the handheld tool battery 28a to handheld tool 10a.

Energy interface 26a takes up an operating energy from handheld tool battery 28a. For this purpose, energy interface 26a of handheld tool add-on measuring device 16a is connected with measuring device interface 34a of handheld tool battery 28a. Handheld tool battery 28a simultaneously supplies energy to main arrangement of action 40a of handheld tool 10a. In order to prevent electromagnetic interference in elements, in particular in main arrangement of action 40a, of handheld tool add-on measuring device 16a in a simultaneous supply of energy, energy interface 26a has an electrical filter (not shown).

Distance measuring sensor 60a measures a distance to the workpiece on three different paths 62a. Paths 62a are not situated in one plane. From the three different distances, distance measuring sensor 60a or control unit 18a of handheld tool 10 is able to determine a distance from insertion tool fastener 46a to the workpiece and from this determine a machining depth. From the latter and from the inclination it is furthermore possible to determine an orientation of system 38a.

Figure 2:
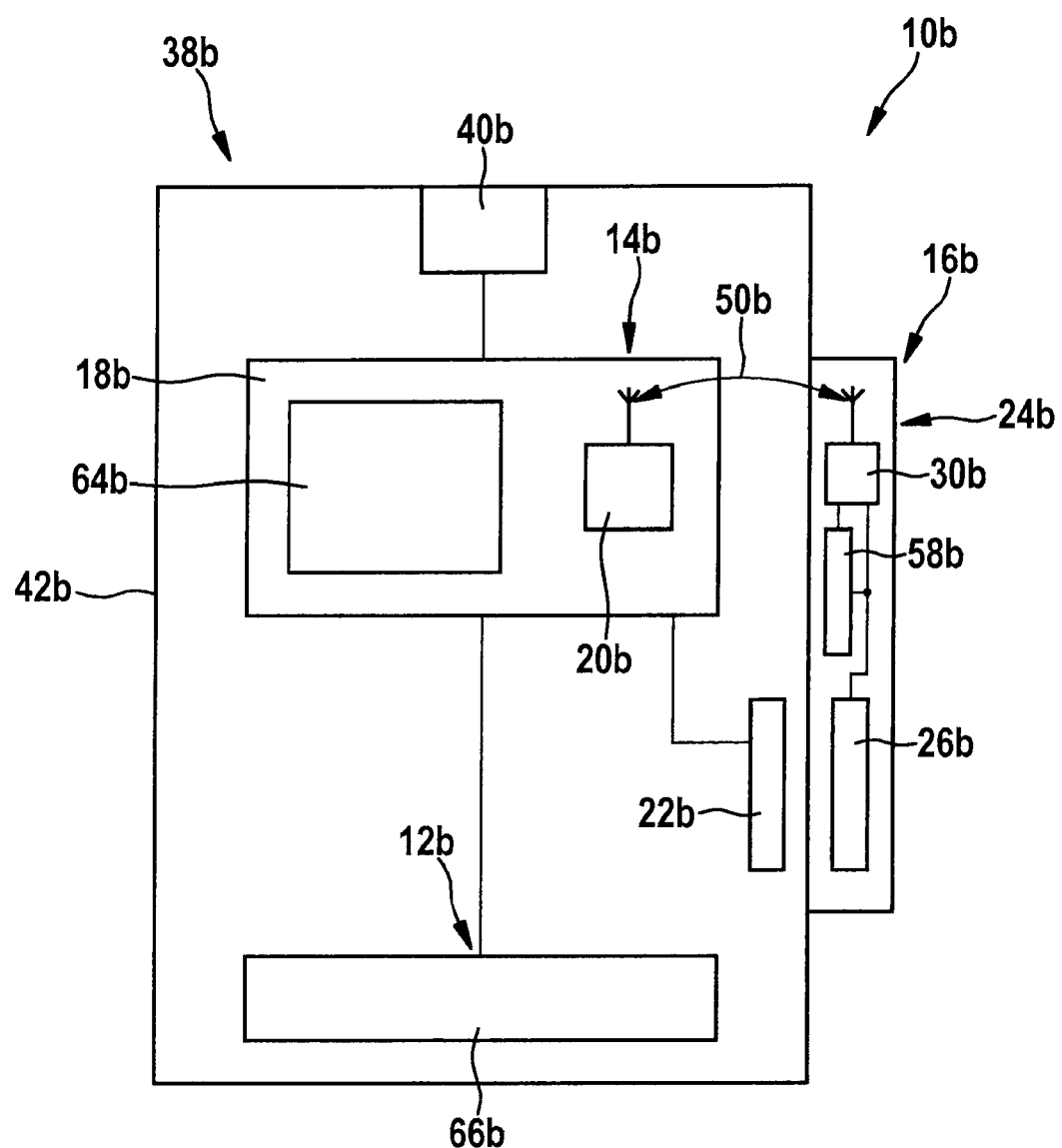
FIG. 2 shows another system according to the present invention having a handheld tool measuring device and a handheld tool add-on measuring device.

FIG. 2 depicts an additional exemplary embodiment of the present invention. In order to differentiate the exemplary embodiments, the letter a in the reference symbols of the exemplary embodiment in FIG. 1 is replaced by the letter b in the reference symbols of the exemplary embodiment in FIG. 2. The subsequent descriptions are essentially limited to the differences between the exemplary embodiments, reference being made to the description of the other exemplary embodiment, in particular of FIG. 1, with regard to components, features and functions that remain unchanged.

FIG. 2 shows another system 38b according to the present invention having a handheld tool 10b and a handheld tool add-on measuring device 16b. Handheld tool 10b is configured as a handheld tool measuring device or as a distance measuring device. Handheld tool 10b has a battery interface 12b, a measuring device interface 14b, a control unit 18b, an energy interface 22b, a main arrangement of action 40b and a handheld tool housing 42b. Main arrangement of action 40b is configured as a distance measuring sensor. Control unit 18b evaluates a characteristic variable of main arrangement of action 40b and represents it on a display arrangement 64b of control unit 18b. Battery interface 12b connects control unit 18b with a battery unit 66b, which, in an operation-ready state is situated within handheld tool housing 42b.

Measuring device interface 14b of handheld tool 10b has a receiving arrangement 20b, which, in operation, receives wirelessly transmitted data containing measuring information. For this purpose, receiving arrangement 20b has a receiver (not shown). The receiver is configured as a ZigBee receiver. Alternatively, a receiver could be configured as a different receiver that seems practical to one skilled in the art. The measuring information contains information about an inclination of system 38b. Control unit 18b determines a distance in a partially automatic manner at a moment at which handheld tool 10b has a specific orientation, in this case, horizontal or vertical.

In operation, energy interface 22b of handheld tool 10b wirelessly outputs an operating energy to handheld tool add-on measuring device 16a. For this purpose, energy interface 22b has a coil (not shown in detail), which transmits the energy inductively.

Handheld tool add-on measuring device 16b is mechanically connected with handheld tool 10b so as to be detachable without the use of a tool. It is situated on an outer side of handheld tool housing 42b. It has an energy interface 26b having a coil (not shown), which receives an energy transmitted wirelessly from handheld tool 10b.

Handheld tool add-on measuring device 16a has a handheld tool interface 24b having a transmitting arrangement 30b and an inclination sensor 58b. Inclination sensor 58b measures a characteristic quantity that describes an inclination of system 38b. In operation, transmitting arrangement 30b transmits the data wirelessly. For this purpose, transmitting arrangement 30b has a transmitter (not shown). The transmitter is configured as a ZigBee transmitter. Alternatively, a transmitter could be configured as a different transmitter that seems practical to one skilled in the art.

What is claimed is:

1. A system, comprising:
a handheld tool add-on measuring device, the handheld tool add-on measuring device including at least one handheld tool interface configured to transmit data containing measuring information of the handheld tool add-on measuring device at least to a handheld tool, and an energy interface configured to receive energy from a handheld tool battery;
a handheld tool, the handheld tool including a battery interface, a drive motor, and at least one measuring device interface, which is configured to receive at least data containing measuring information of the handheld tool add-on measuring device to influence a work process of the drive motor as a function of the measuring information;
the handheld tool battery, the handheld tool battery including a handheld tool interface configured to supply power to the battery interface of the handheld tool, and a battery measuring device interface configured to supply power to the energy interface of the handheld tool add-on measuring device,
wherein the measuring device interface of the handheld tool is situated in or on a side of a housing of the handheld tool,
wherein the handheld tool add-on measuring device is disconnectable without the use of a tool.

2. The system of claim 1, further comprising:
a control unit configured to influence the work process of the drive motor as a function of the measuring information.

3. The system of claim 2, wherein the control unit is configured to stop the work process of the drive motor as a function of the measuring information.

4. The system of claim 1, wherein the measuring device interface includes at least one receiving arrangement for receiving wirelessly transmitted data containing measuring information of the handheld tool add-on measuring device.

5. The system of claim 1,
wherein the energy interface, in at least one operating state, outputs an operating energy to the handheld tool add-on measuring device.

6. The system of claim 1, further comprising:
at least one switching element to switch, as a function of the data containing measuring information, an energy supply of the handheld tool at least one of on or off.

7. The system of claim 1, further comprising:
a handheld tool battery which is electrically and mechanically connected to the battery interface.

8. The system of claim 1, wherein the battery interface and the measuring device interface of the handheld tool are at least one of functionally separated or spatially separated from one another.

9. The system of claim 1, wherein the handheld tool interface of the handheld tool add-on measuring device includes a transmitting device configured to transmit data containing measuring information wirelessly to a receiving device of the measuring device interface of the handheld tool.

10. The system of claim 1, wherein the handheld tool interface of the handheld tool add-on measuring device is directly connected to the handheld tool.

11. The system of claim 1, wherein the handheld tool interface of the handheld tool battery is directly connected to the handheld tool.

12. The system of claim 11, wherein the handheld tool interface of the handheld tool add-on measuring device is indirectly connected to the handheld tool and transmits data containing measuring information via the handheld tool battery.

13. The system of claim 1, wherein the handheld tool battery includes a housing, the handheld tool interface and the measuring device interface of the handheld tool battery being disposed on opposite sides of the housing.

14. The system of claim 1, wherein the handheld tool add-on measuring device includes a measuring sensor configured to provide at least one measuring information selected from the group of inclination, distance, temperature, humidity, and condition of a workpiece.

15. A system, comprising:
a handheld tool add-on measuring device, the handheld tool add-on measuring device including at least one handheld tool interface configured to transmit data containing measuring information of the handheld tool add-on measuring device at least to a handheld tool, and an energy interface configured to receive energy from a handheld tool battery;
a handheld tool, the handheld tool including a battery interface, a drive motor, and at least one measuring device interface, which is configured to receive at least data containing measuring information of the handheld tool add-on measuring device to influence a work process of the drive motor as a function of the measuring information;
the handheld tool battery, the handheld tool battery including a handheld tool interface configured to supply power to the battery interface of the handheld tool, and a battery measuring device interface configured to supply power to the energy interface of the handheld tool add-on measuring device,
wherein the measuring device interface of the handheld tool is situated in or on a side of a housing of the handheld tool,
wherein the handheld tool add-on measuring device is embodied as a retrofit measuring device which is constructionally separated from the handheld tool and the handheld tool battery.

16. The system of claim 15, wherein the handheld tool add-on measuring device is disconnectable without the use of a tool.

17. A system, comprising:
a handheld tool add-on measuring device, the handheld tool add-on measuring device including at least one handheld tool interface configured to transmit data containing measuring information of the handheld tool add-on measuring device at least to a handheld tool, and an energy interface configured to receive energy from a handheld tool battery;
a handheld tool, the handheld tool including a battery interface, a drive motor, and at least one measuring device interface, which is configured to receive at least data containing measuring information of the handheld tool add-on measuring device to influence a work process of the drive motor as a function of the measuring information;
the handheld tool battery, the handheld tool battery including a handheld tool interface configured to supply power to the battery interface of the handheld tool, and a battery measuring device interface configured to supply power to the energy interface of the handheld tool add-on measuring device,
wherein the measuring device interface of the handheld tool is situated in or on a side of a housing of the handheld tool,
wherein the handheld tool add-on measuring device is configured to be manually connected to and disconnected from the handheld tool without the use of a tool.

* * * * *